July 30, 1963 R. B. MAAS 3,099,346
POWER TRANSMISSION AND CONVEYING CHAIN
Filed May 11, 1961
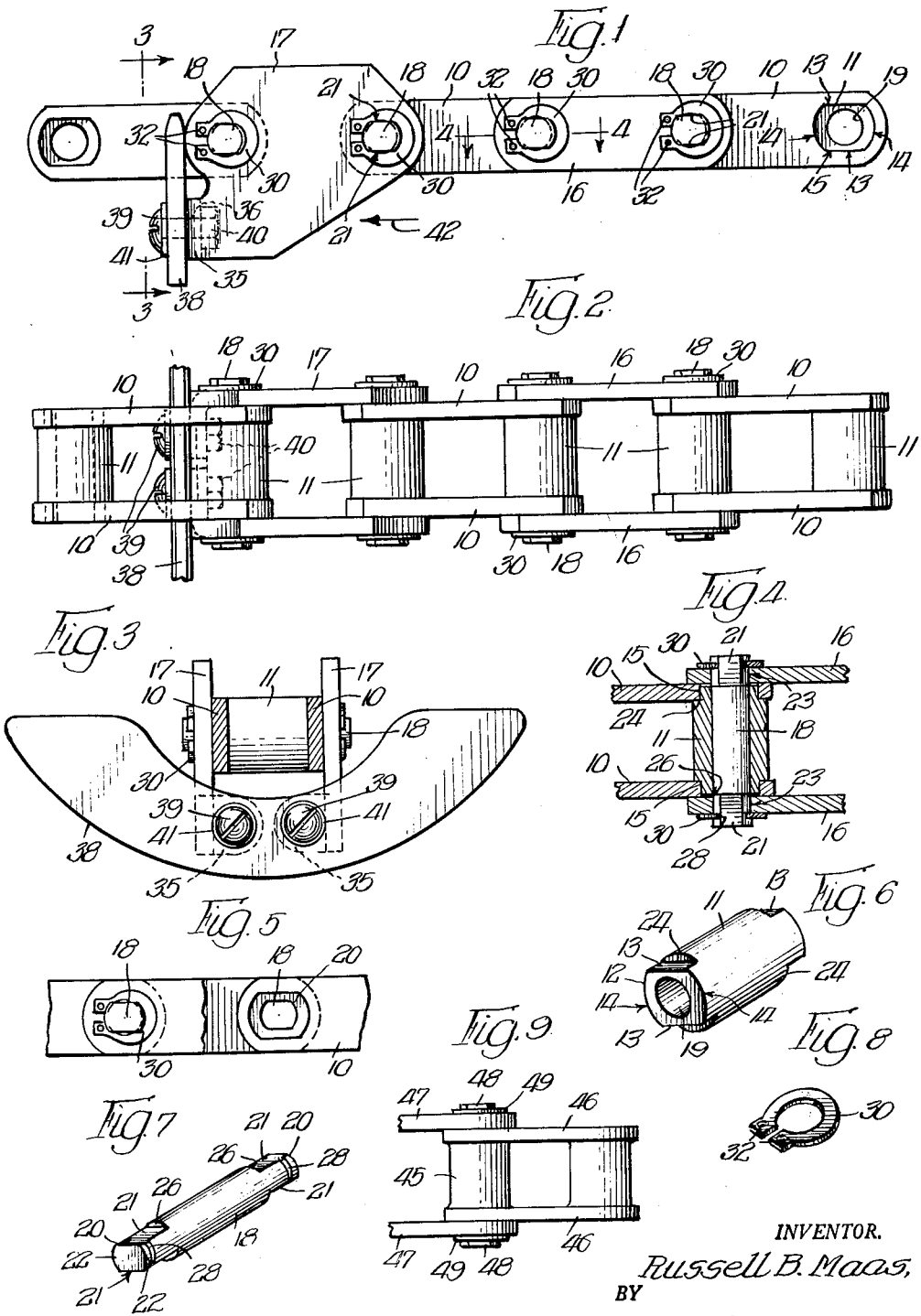
INVENTOR.
Russell B. Maas,

United States Patent Office 3,099,346
Patented July 30, 1963

3,099,346
POWER TRANSMISSION AND CONVEYING CHAIN
Russell B. Maas, Palos Park, Ill., assignor to Screw Conveyor Corporation, Hammond, Ind., a corporation of Illinois
Filed May 11, 1961, Ser. No. 109,293
4 Claims. (Cl. 198—174)

This invention relates to an improved power transmission and conveying chain.

While the particular chain which I shall describe hereinafter in connection with the drawings is a chain adapted for use, for example, in conveying apparatus, in general, of the type disclosed in the copending application of Edward P. Escher, Serial No. 849,306, filed October 28, 1959, now Patent No. 3,047,128, or in vertical lifts or bucket elevators, it is to be understood that the chain of the present invention is not limited to such uses but may be employed in all similar apparatus and for all similar work.

Heretofore, transmission and conveying chains of the character with which the present invention is concerned have employed pins with riveted, headed or cottered construction.

These prior schemes have the objection of more costly construction; also increased production time and increased maintenance and repair costs which are of major importance.

The chief advantage of my invention is in the provision of a chain of the character described wherein the production time and maintenance and repair costs incidental to the wearing qualities of the chain are reduced.

Moreover, the improved power transmission and conveying chain of the present application is considerably easier to assemble and disassemble and requires less costly tooling.

The main concept of the present invention resides in the provision of pins having ends provided with flat surfaces and arcuate surfaces between the flat surfaces and which pin ends are inserted through correspondingly shaped openings in the side bars of the chain and project outwardly from the side bars with grooves in the arcuate surfaces adjacent to the outer sides of the side bars and snap rings removably engaged in the grooves and hugging the outer surfaces of the side bars.

The aforementioned snap ring structure is less costly to produce; the snap rings do not wear out when in contact with abrasive material; the chain is considerably easier to assemble and disassemble; the snap rings hugging the side bars do not pick up material which is being conveyed by flights, buckets, or other conveying members attached to the side bars of the chain; and tooling is less costly.

Numerous advantages and adaptations of the invention will be apparent from the following detailed description taken in connection with the accompanying drawings, it being understood that the invention is limited only within the scope of the appended claims and not to the particular embodiments selected for illustration.

In the drawings:

FIGURE 1 is a fragmentary side elevational view of a power transmitting and conveying chain embodying the present invention with the outer side bars at the ends of the illustrated portion of the chain removed to show the manner in which the ends of the hardened steel bushings are locked against rotation in openings in the inner side bars;

FIGURE 2 is a top plan view of the portion of the chain illustrated in FIGURE 1;

FIGURE 3 is a sectional view taken generally along the line 3—3 of FIGURE 1 and showing fragmentarily one form of conveyor flight attached to the attachment links of the chain;

FIGURE 4 is a sectional view taken generally along the line 4 of FIGURE 1;

FIGURE 5 is a fragmentary side view with one of the outer side bars broken away and the snap ring removed to show the end of the pin for locking against rotation in the correspondingly shaped opening in the outer side bar;

FIGURE 6 is a perspective view of one of the hardened steel bushings;

FIGURE 7 is a perspective view of one of the pins;

FIGURE 8 is a perspective view of one of the snap rings; and

FIGURE 9 is a fragmentary plan view of another form of power transmitting and conveying chain embodying the present invention in which the chain barrel is in the form of a malleable iron casting instead of in the form of a steel bushing as illustrated in FIGURES 1 through 6.

Referring to the drawings, the transmission and conveying chain according to the present invention, as illustrated in FIGURES 1 through 8, comprises pairs of inner side bars 10—10 of steel or other suitable material and hardened steel tubular bushings 11 having opposite ends 12 provided with flat surfaces 13 with arcuate surfaces 14 between the flat surfaces 13 with these ends engaging in holes 15 of similar shape in the inner side bars 10—10 and locking the bushings 11 against rotation. The flat surfaces 13 at each end of the bushings 11 are shown in parallel relation and are preferably formed by shaving operations, although they may be milled or otherwise formed.

Outer side bars, as exemplified by the outer side bars 16—16 and the outer side or attachment bars 17—17, are disposed over the outer sides of the inner side bars 10—10.

Pins 18, preferably hardened alloy steel pins, although this may vary, are inserted through the openings 19 in the bushings 11 and have opposite ends 20 with flat surfaces 21 and arcuate surfaces 22 between the flat surfaces 21 which engage in holes 23 of similar shape in the outer side bars 16—16 and 17—17 and lock the pins 18 against rotation. The flat surfaces at opposite ends of the pins 18 are shown in parallel relation and are also preferably formed by shaving operations, although they may be milled or otherwise formed.

The flat surfaces 13 at the opposite ends of the bushings 11 form radial abutments, as illustrated at 24 in FIGURE 6. These abutments 24 by cooperation with the inner surfaces of the inner side bars 10—10 maintain the desired spacing of these inner side bars.

The flat surfaces 21 at the opposite ends of the pins 18 form radial abutments, as illustrated at 26 in FIGURE 7. These abutments 26 by cooperation with the inner surfaces of the outer side bars 16—16 and the outer side bars 17—17 maintain the desired spacing of these outer side bars.

The ends of the pins 18 with the flat surfaces 21 and arcuate surfaces 22 project outwardly from the outer side bars 16 and have grooves 28 in the arcuate surfaces 22 adjacent the outer sides of the side bars. Metallic snap rings 30 are removably engaged in the grooves 28 at both ends of each pin 18 and hug the outer sides of the side bars 16 and 17. The snap rings 30 retain the arms 16 and 17 in place on the ends of the pins 18 with the arms 16 between the arms 16—16 and 17—17 and the cylindrical portions of the bushings 11 between the arms 10—10.

The rings 30 are split rings with sufficient resilience to contract inwardly into the grooves 28. The ends of the rings 30 have holes or openings 32 for engagement therewith of a tool for expanding the rings for removal from and application to the grooves 28. As illustrated in FIGURE 4, the opposite ends 12 of the bushings 11 preferably terminate slightly short of the outer surfaces of the side bars 10.

The use of snap thrust rings 30 on both ends of each pin 18 provides a chain structure which is less costly to produce and is considerably easier to assemble and disassemble. The snap rings 30 do not wear out when in contact with abrasive material being conveyed and they hug the side bars 16 and 17 and do not pick up material being conveyed. The reduction in production time and the reduction in maintenance and repair costs incidental to the wearing qualities of the chain are of major importance.

In use, the chain of the present application may be trained, for example, about cast tooth sprockets and traction wheels, not shown.

Where the chain is used in conveying apparatus of the type disclosed in the previously identified application of Edward P. Escher, the side bars 17 may have inturned attachment lugs 35 having openings 36. Flights, one illustrative form of which is indicated in outline in 38 in FIGURE 3, are attached to the lugs 35, for example, by machine screws 39. The shanks of the screws 39 pass through openings in the flight 38 or the backing plate therefor and engage in lock nuts 40. Washers 41 may be provided between the heads of the screws 39 and the flight 38 or backing plate therefor.

The chain may be driven in the direction indicated by the arrow 42 in FIGURE 1 and the flights 38 convey the material in that direction, for example, along a conveyor trough, not shown.

In FIGURE 9, the chain barrel instead of being in the form of a hardened bushing, as previously described, is in the form of a malleable iron casting 45 with the side portions 46—46 integral therewith. The side bars 47—47 correspond with the outer side bars 16—16 or 17—17, as previously described, and the pins 48 and snap rings 49 are of the forms previously described.

The embodiments of the invention disclosed in the drawings and specification are for illustrative purposes only, and it is to be expressly understood that said drawings and the specification are not to be construed as a definition of the limits or scope of the invention, reference being had to the appended claims for that purpose.

I claim:

1. A chain comprising a pair of inner links spaced apart laterally by a tubular member fixed against rotation relative to said inner links and exposed outwardly throughout the entire lateral space between said inner links for direct cooperation between said inner links with a sprocket, outer links having opposite ends disposed with their inner surfaces over the outer surfaces of the ends of said inner links and having openings with opposite flat surfaces and arcuate surfaces between said flat surfaces in axial alignment with said tubular member, a pin passing through and rotatable in said tubular member and having ends with corresponding flat surfaces and arcuate surfaces between said flat surfaces passing through the corresponding openings in said outer links and fixed against rotation relative to said outer links, said outer links being fixed at all times against longitudinal movement in a direction across the axis of said pin, means on opposite ends of said pin and coacting with the outer surfaces of said outer links for retaining the outer links in place on the ends of said pin with the ends of their inner surfaces disposed over the ends of the outer surfaces of said inner links, the means at one end at least of said pin for retaining the outer link in place comprising grooves in said arcuate surfaces of said pin, and a split snap ring individual to a single pin and having resilience of a character to self contract inwardly into said grooves in position coacting with the outer surface of the end of the adjacent outer link for retaining said outer link in place on said pin, said snap ring being adapted to be expanded outwardly against its self contracting resilience for removal from and application to the groove in said pin.

2. A chain according to claim 1, wherein the tubular member is integral with the inner links of the chain.

3. A chain according to claim 1, wherein the split snap ring has adjacent ends provided with openings for engagement by a tool for expanding the ring for removal from and application to the groove in the pin.

4. A power transmission and conveying chain according to claim 1, wherein certain of said outer links are wider than the other outer links and have laterally turned lugs thereon, and a conveyor flight disposed laterally of the path of movement of said chain and attached to said laterally turned lugs.

References Cited in the file of this patent

UNITED STATES PATENTS

| | | |
|---|---|---|
| 505,296 | Pollock | Sept. 19, 1893 |
| 1,694,746 | Landahl | Dec. 11, 1928 |
| 1,893,467 | Merwin | Jan. 3, 1933 |

FOREIGN PATENTS

| | | |
|---|---|---|
| 1,183,349 | France | Jan. 26, 1959 |